(12) United States Patent
Montelius et al.

(10) Patent No.: US 7,966,881 B2
(45) Date of Patent: Jun. 28, 2011

(54) ARRANGEMENT FOR DETECTING RESONANCE FREQUENCY SHIFTS

(75) Inventors: Lars Montelius, Bjärred (SE); Sara Ghatnekar-Nilsson, Lund (SE)

(73) Assignee: Nems AB, Lund (SE)

( * ) Notice: Subject to any disclaimer, the term of this patent is extended or adjusted under 35 U.S.C. 154(b) by 124 days.

(21) Appl. No.: 12/226,658

(22) PCT Filed: Apr. 25, 2007

(86) PCT No.: PCT/SE2007/000404
§ 371 (c)(1),
(2), (4) Date: Jul. 16, 2009

(87) PCT Pub. No.: WO2007/123473
PCT Pub. Date: Nov. 1, 2007

(65) Prior Publication Data
US 2010/0013456 A1   Jan. 21, 2010

(30) Foreign Application Priority Data
Apr. 26, 2006  (SE) ........................ 0600916

(51) Int. Cl.
*G01N 29/12* (2006.01)
(52) U.S. Cl. ................. 73/580; 73/579; 73/657
(58) Field of Classification Search .......... 73/580, 73/579, 602, 649, 657
See application file for complete search history.

(56) References Cited

U.S. PATENT DOCUMENTS

| | | | | |
|---|---|---|---|---|
| 4,479,385 A | * | 10/1984 | Koehler | .......... 73/514.29 |
| 5,554,935 A | * | 9/1996 | Kraszewski et al. | .......... 324/637 |
| 6,452,170 B1 | * | 9/2002 | Zypman et al. | .......... 850/33 |
| 6,575,020 B1 | | 6/2003 | De Charmoy Grey et al. | |
| 6,651,504 B1 | | 11/2003 | Datskos et al. | |

(Continued)

FOREIGN PATENT DOCUMENTS
WO   WO 2005/119233   12/2005

OTHER PUBLICATIONS

Barnes et al., "Photothermal spectroscopy with femtojoule sensitivity using a micromechanical device," Nature, vol. 372, p. 79-81 (Nov. 3, 1994).

(Continued)

*Primary Examiner* — Jacques M Saint Surin
(74) *Attorney, Agent, or Firm* — Finnegan, Henderson, Farabow, Garrett & Dunner, LLP

(57) ABSTRACT

The present invention relates to an arrangement (1) for detection of a first resonance frequency (F1), related to a mass (1b') loaded carrier means (1b), and to compare said first resonance frequency (F1) with a second, as a reference used, resonance frequency (F2), related to said carrier means (1b), by using frequency comparing and/or calculating means (3, 4) to evaluate, by a noted frequency shift (F2-F1), a mass weight (1b'). An array of individual carrier means (1a, 1b ... 1n) are arranged adjacent to each other, that one or more of said carrier means are allotted different second resonance frequencies, that received resonance frequencies (F1) from said loaded carrier means are received and/or evaluated simultaneously, or at least essentially simultaneously, in a signal receiving and/or processing unit (3) and that said first resonance frequencies (F1) are compared and/or calculated within said calculating means (3, 4) with corresponding resonance frequencies (F2) stored in said unit (3, 4) in a memory (4b) thereof.

22 Claims, 1 Drawing Sheet

U.S. PATENT DOCUMENTS

| | | | |
|---|---|---|---|
| 7,671,511 B2* | 3/2010 | Battiston | 310/316.01 |
| 2003/0045019 A1 | 3/2003 | Kubena et al. | |
| 2003/0068655 A1 | 4/2003 | Bottomley et al. | |
| 2005/0016276 A1* | 1/2005 | Guan et al. | 73/579 |
| 2005/0018946 A1 | 1/2005 | Tran et al. | |
| 2005/0097962 A1 | 5/2005 | Lee et al. | |
| 2005/0112621 A1 | 5/2005 | Kim et al. | |
| 2010/0089156 A1* | 4/2010 | Morii | 73/504.12 |
| 2010/0139400 A1* | 6/2010 | Morii | 73/504.12 |

OTHER PUBLICATIONS

Battiston et al., "A chemical sensor based on a microfabricated cantilever array with simultaneous resonance-frequency and bending readout," Sensors and Actuators B 77, issues 1-2, p. 122-131 (2001).

Berger et al., "Surface Stress in the Self-Assembly of Alkanethiols on Gold," Science, vol. 276, No. 5321, p. 2021-2024 (1997).

Binnig et al., "Atomic Force Microscope," Phys. Rev. Letters, vol. 56, p. 930-933 (1986).

Ekinci et al., "Ultimate limits to inertial mass sensing based upon nanoelectromechanical systems," J. Appl. Phys., vol. 95, p. 2682-2689 (2004).

Giessibl, "Atomic Resolution of the Silicon (111)-(7x7) Surface by Atomic Force Microscopy," Science, vol. 267, No. 5194, p. 68-71 (1995).

Fritz et al., "Translating Biomolecular Recognition into Nanomechanics," Science, vol. 288, No. 5464, p. 316-318 (2000).

Kar et al., "Improved detection of thermally induced higher resonance modes and harmonics of a microcantilever," Journal of Applied Physics, vol. 94, p. 4626-4631 (2003).

Lang et al., "A chemical sensor based on a micromechanical cantilever array for the identification of gases and vapors," Appl. Phys. A 66, p. S61-S64 (1998).

Lang et al., "Cantilever array sensors," Materials Today, vol. 8, p. 30-36 (2005).

McKendry et al., "Multiple label-free biodetection and quantitative DNA-binding assays on a nanomechanical cantilever," Proc Natl Acad Sci, vol. 99, p. 9783-9788 (2002).

* cited by examiner

ARRANGEMENT FOR DETECTING RESONANCE FREQUENCY SHIFTS

CROSS REFERENCE TO RELATED APPLICATIONS

This application is a national stage filing under 35 U.S.C. §371 of International Application No. PCT/SE2007/000404, filed on Apr. 25, 2007, and claims the benefit of priority of Swedish Application No. 0600916-1, filed on Apr. 26, 2006. All of these applications are incorporated herein by reference in their entirety.

TECHNICAL FIELD OF THE INVENTION

The present invention generally relates to an arrangement for detection of resonance frequency shifts, based upon an added mass weight.

The invention thus relates to an arrangement adapted for detection of a first resonance frequency, related to a mass loaded or mass added carrier means, by comparing said first resonance frequency with a second resonance frequency, used as a reference frequency, related to said carrier means alone, by using a frequency comparing and/or calculating means, to evaluate, by a noted frequency shift, an added mass weight.

It is further suggested that said carrier means may be related to mechanical cantilever beams, illustrated as simply cantilevers, and more particularly to evaluate and measure the oscillating frequency that is related to a cantilevers under a mass load and formed with very small dimensions, such as within the nanometer ($10^{-9}$) scale.

The present invention makes use of an array of individual mechanical cantilevers, in an attempt to measure any mass change, loaded onto said cantilever and evaluate any frequency shift.

Said frequency shift is depending upon the value of the mass weight carried by the carrier means and its generated first resonance frequency and related to a second resonance frequency used as a reference frequency, based on an unloaded carrier means, especially represented by a cantilever in the following description.

BACKGROUND OF THE INVENTION

Methods, systems and/or arrangements falling, within the above technical field and the above mentioned natures are previously known in a plurality of different forms and/or embodiments.

By way of introduction here, the Scanning Probe Microscopy (SPM) has been used for the development within the nano-science area. The use of resonance frequentcy shifts of oscillating movement for imaging (non-contact mode) has made it possible to image true atomic resolution.

Since mid 1990s cantilevers have been utilized, not only for forced transducers in SPM but also for sensing applications, whereby various kinds of interactions with and on a cantilever surface have been translated or transformed into a mechanical motion.

The principle behind how cantilevers may transduce and interpret events on its surface thereof relates to either a mass changing, depending upon mass absorption of a resonating system or on a surface stress, causing the cantilever beam to bend.

By this it has been able and possible to measure various properties with higher sensitivity than conventional methods.

Examples are exothermic and/or endothermic reactions, i.e. heat, mass changes, surface stress, molecular interactions, detection of vapors, protein interactions, DNA and recently antigen-antibody reactions.

These properties have been studied in various kinds of environments, such as in air, in vacuum and within a liquid.

Typically, the cantilevers being exploited or used in these areas, have been allotted dimensions in the micrometer ($10^{-6}$) scale or area, their selected lengths are in the range of 100 s of micrometers, widths of roughly 100 micrometers ($\mu m$) and thicknesses around 500 nm ($10^{-9}$).

Typically, for such cantilevers, a surface stress of $10^{-3}$ N/m causes a bending of around 10 nm; a change of 1 Hz between measured resonance frequencies corresponds to a mass increase of $10^{-6}$ g, and/or a temperature change of $10^{-5}$ K, causing a deflection of some nanometers.

Such values are straight forward to measure, often based on optical deflection technology, utilizing the reflection of a focused laser light spot, onto a position within a light sensitive detector.

Thus, bearing in mind that the resolution limits in SPM-systems are around or better than 1 Å or so, it has been possible to obtain sensitivities for mass changes of ≈ag, heat of 1 J, surface stress of 0.1 $\mu N|m$.

Further prior art publications are to be found in the "Reference List" attached to this description as its last page.

The present invention thus is a further development of an arrangement for detection of a first resonance frequency, related to a mass weight loaded carrier means, and to compare said first resonance frequency with a second resonance frequency, serving as a reference frequency, related to said carrier means alone, without said mass weight, by using a frequency comparing and/or calculating means to evaluate, by a noted frequency shift, for the loaded mass a significant mass weight as illustrated in the preamble of claim 1.

SUMMARY OF THE PRESENT INVENTION

Technical Problems

If attention is paid to the circumstances that the technical considerations a person skilled in the relevant technical field has to make, in order to be able to present a solution to one or more technical problems raised, initially there is to be a necessary insight in the measures and/or the sequence of measures that should be taken as well as a necessary choice of the means that is or are required, the subsequent technical problems should, in view of this, be relevant in creating and forming the present subject of invention.

When taking the prior art into consideration, as it is described above, it should, therefore, be seen as a technical problem to be able to realize the significance of, the advantages associated with and/or the steps to be taken, when dealing with an arrangement for detection of a first resonance frequency, related to a mass loaded carrier means, and to compare said first resonance frequency with a second resonance frequency, as a reference frequency, related to said carrier means alone (without added mass weight), by using a frequency comparing and/or calculating means, by said means it will be possible to evaluate, by a noted frequency shift, an added mass weight, to make use of an array of individual carrier means, arranged adjacent to each one of or selected cooperated carrier means each having its allotted resonance frequency.

It is to be seen as a technical problem to be able to realize the significant of, the advantages associated with and/or the technical steps and challenges to be taken in order to give an advice that one or more of said carrier means are to be allotted different, however adjacent oriented second resonance frequencies.

It is to be seen as a technical problem to be able to realize the significant of, the advantages associated with and/or the technical steps and challenges to be taken in order to give an advice that caused and received resonance frequencies from said mass loaded carrier means are received and/or evaluated simultaneously, or at least essentially simultaneously, in a signal receiving unit.

It is to be seen as a technical problem to be able to realize the significant of, the advantages associated with and/or the technical steps and challenges to be taken in order to give an advice that said first resonance frequencies are compared and/or calculated within said calculating means with corresponding resonance frequencies stored in said unit as carrier means related reference frequencies.

It is to be seen as a technical problem to be able to realize the significant of, the advantages associated with and/or the technical steps and challenges to be taken in order to give an advice that an oscillating frequencies generating means is to be adopted to generate and/or excite resonance frequencies to said array of carrier means.

It is to be seen as a technical problem to be able to realize the significant of, the advantages associated with and/or the technical steps and challenges to be taken in order to give an advice that said oscillating means is to be adopted to and related to a frequencies sweeping type.

It is to be seen as a technical problem to be able to realize the significant of, the advantages associated with and/or the technical steps and challenges to be taken in order to give an advice that said oscillating means is to be adopted to generate and/or excite one single and fixed frequency, exposing a frequency value exceeding the highest frequency related to the highest basic resonance frequency.

It is to be seen as a technical problem to be able to realize the significant of, the advantages associated with and/or the technical steps and challenges to be taken in order to give an advice that said array of individual carrier means, in the form of cantilevers or the like, are to be arranged adjacent to each other.

It is to be seen as a technical problem to be able to realize the significant of, the advantages associated with and/or the technical steps and challenges to be taken in order to give an advice for detecting shifts in the oscillation frequencies in mechanical carrier means, and especially means exposing dimensions within the nano-meter scale.

It is to be considered that a technical problem is linked to the efforts of being able to realize the significance of, the advantages associated with and/or the steps to be taken when dealing with arrangements exposing an array of individual cantilevers arranged or gathered adjacent each other.

It is to be considered that a technical problem is linked to the efforts of being able to realize the significance of, the advantages associated with and/or the steps to be taken when dealing with arrangements where one or more of these cantilevers is given different dimensions for adjusting its resonance frequency, especially directed only to chosen length(s) dimensions.

It is to be considered that a technical problem is linked to the efforts of being able to realize the significance of, the advantages associated with and/or the steps to be taken when dealing with arrangements where said carrier means and/or cantilevers are illuminated, from a light beam generated by a light source, in such a manner that a light beam signal is to be reflected from an illuminated side of the cantilevers to a position-sensitive photodiode.

It is to be considered that a technical problem is linked to the efforts of being able to realize the significance of, the advantages associated with and/or the steps to be taken when dealing with arrangements, where said photodiode is in its turn adapted to generate and emit an electrical signal in response to the position and frequency of each cantilever.

It is to be considered that a technical problem is linked to the efforts of being able to realize the significance of the advantages associated with and/or the steps to be taken when dealing with arrangements whereby said cantilevers do permit a detection of all the resonance frequency, and especially from each cantilever simultaneously.

It is to be considered that a technical problem is linked to the efforts of being able to realize the significance of, the advantages associated with and/or the steps to be taken when dealing with arrangements where frequencies or differences or shifts in frequencies are detected from each individual cantilever, which occur when the mass weight of the individual cantilevers changes.

It is to be considered that a technical problem is linked to the efforts of being able to realize the significance of, the advantages associated with and/or the steps to be taken when dealing with arrangements where a mass weight change is related directly to a mass weight having been adsorbed in some way on the surfaces of any of the cantilevers.

It is to be considered that a technical problem is linked to the efforts of being able to realize the significance of, the advantages associated with and/or the steps to be taken when dealing with arrangements, where a mass weight change, on at least one of the cantilevers, is realized by means of a controlled interaction between a surface and an object possessing mass.

It is to be considered that a technical problem is linked to the efforts of being able to realize the significance of, the advantages associated with and/or the steps to be taken when dealing with arrangements, where said controlled interaction consists of one or more molecular reactions.

It is to be considered that a technical problem is linked to the efforts of being able to realize the significance of, the advantages associated with and/or the steps to be taken when dealing with arrangements, where said controlled interaction consists of one or more chemical reactions, and/or one or more physical reactions.

It is to be considered that a technical problem is linked to the efforts of being able to realize the significance of, the advantages associated with and/or the steps to be taken when dealing with arrangements to realize that in most applications adapted for using these kinds of devices and arrangements for bio-detection purposes, it is suggested to utilize an array of a predetermined number of cantilevers.

It is to be considered that a technical problem is linked to the efforts of being able to realize the significance of the advantages associated with and/or the steps to be taken when dealing with arrangements exposing either one laser beam per cantilever or one single laser beam in common, said beam being switched between different cantilevers within one single array of cantilevers.

It is to be considered that a technical problem is linked to the efforts of being able to realize the significance of, the advantages associated with and/or the steps to be taken when dealing with arrangements, where it is difficult to obtain time resolved measurements and information about the interpretation of signals directed towards the detector surfaces.

It is to be considered that a technical problem is linked to the efforts of being able to realize the significance of, the advantages associated with and/or the steps to be taken when dealing with arrangements, where the time resolution is limited and hence an important parameter is lost, namely the dime domain that will be hidden, making such a system a quasi-continuous detection system.

It is to be considered that a technical problem is linked to the efforts of being able to realize the significance of, the advantages associated with and/or the steps to be taken when dealing with arrangements, where the sensitivity of the used mechanical cantilevers depend on the dimensions of the cantilever and enhance sensitivity by predetermined downscaling said cantilever beams into the nanometer scale or area.

It is to be considered that a technical problem is linked to the efforts of being able to realize the significance of, the advantages associated with and/or the steps to be taken when dealing with arrangements, where cantilevers are scaled down below typical laser light wavelengths, making standard optical methods difficult to employ.

The Solution

The present invention relates to and comprises means and arrangements as stated in the preamble of claim 1.

In order to be able to solve one or more of the above-mentioned technical problems, the present invention in particular teaches that the technique known in this manner should be supplemented with features found in the characterizing part of Claim 1.

Further embodiments linked to the present invention are stated in the attached sub-claims.

Advantages

The advantages that foremost can be regarded as characteristic of the present invention and the special significative features provided thereby are that, in this way, conditions have been created in order to realize that as mass adsorbs onto the different carrier means and/or cantilevers their individual resonance frequency will be reduced and shift, which is to be detected in the frequency mode as a function of time.

From the measurements of the individual frequency shifts this are easily determined by comparing a measured resonance frequency with an already stored frequency value, used as a reference frequency value.

This system is very time efficient since it is based on a simultaneous measurement on a plurality of adjacent orientated carrier means or cantilevers.

Functionalizing the cantilevers differently, in terms of chemical or molecular reactive function, gives a direct "fingerprint" on a known or an unknown mix of gases or molecules that inhibits the counter molecule.

This system allows a fast detection mode and by shrinking or reducing the dimensions of the carrier means and/or cantilevers, ultimately into the nanometer scale area, will realize an increase in sensitivity of several orders of magnitude. This enables a detection of sensitivity down to a few molecules.

What foremost is to be regarded as characteristic of the present invention is defined and stated in the characterizing clause of the subsequent Claim 1.

BRIEF DESCRIPTION OF THE DRAWINGS

The present invention is to be described more in detail as, at present suggested, embodiment(s) with reference to the accompanying drawings, wherein;

FIG. 1a. is illustrating a large standard-sized cantilever beam,

FIG. 1b. is illustrating one single cantilever beam, in a nano-scaled dimension and FIG. 1c. is illustrating a group of or an array of individual nano-scaled cantilevers, according to the present invention, and exposing different resonance frequencies, and the circles are intended to symbolize the orientation of a focused laser bream spot for detecting an oscillating movement of said cantilevers in the purpose of detecting and evaluating oscillating first frequencies.

DESCRIPTION OF NOW PROPOSED EMBODIMENT EXPOSING THE SIGNIFICATIVE FEATURES RELATED TO THE PRESENT INVENTION

It should than by way of introduction be emphasized that in the subsequent description a presently proposed embodiments, where each has the significative features associated with the invention and which is elucidated by figures, shown in the appended drawings, it has been chosen terms, expression and a particular terminology with the intention to thereby primarily allow to make clear the fundamental idea and/or ideas of the invention.

It should, however, in this connection be taken into consideration that expressions chosen here should not be seen as limiting solely to the terms utilized and chosen here, but it should be understood that each term chosen in this manner should be interpreted so that it, in addition, comprises all technical equivalents that operate in the same or substantially the same way, in order to, in this way, enable the achievement of the same or substantially the same intention and/or technical effect.

Figure 1:
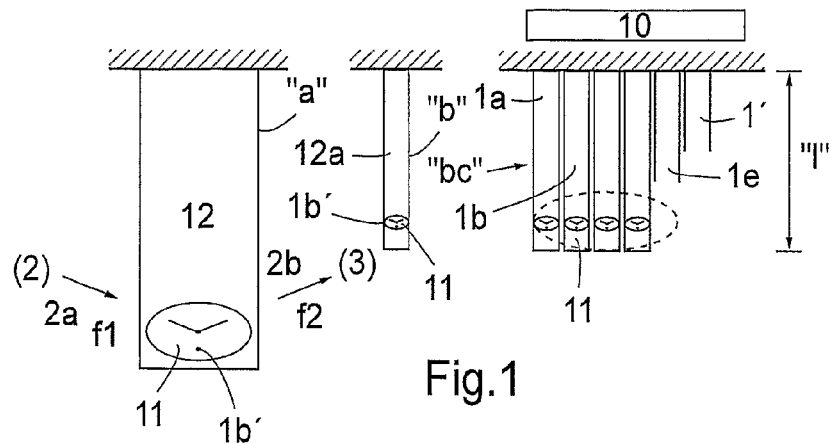
FIG. 1 illustrates three different embodiments of carrier means, in the form of cantilevers, and their orientation in a horizontal plane, where under.

Thus FIG. 1 illustrates three different embodiments of carrier means, in the form of cantilevers, and their orientation in a horizontal plane, where under FIG. 1a is illustrating a large standard-sized cantilever beam 12, towards which is directed from a source (2) a laser beam 2a, exposing a frequency of "f1", and this beam 2a is reflected by a surface 11 to form a reflected beam 2b, exposing a frequency of "f2", directed to a receiving unit (3).

The reflected beam 2b contains information of the resonance frequency "f2" significant for the cantilever 12 only.

FIG. 1b is illustrating one single cantilever beam 12a, in a nano-scaled dimension and this arrangement has a light reflecting surface 11 similar to FIG. 1a.

The resonance frequency of the cantilever 12, 12a is dependent of the dimensions chosen and this resonance frequency is lower when the cantilever is carrying a load (1b').

It is previously known that a frequency discrepancy of the resonance frequencies related to the cantilever 12 resp. 12a, when the cantilever 12, 12a are loaded with a mass load 1b', designated the first resonance frequency F1, and when the cantilever 12 resp. 12a are without such mass weight, designated a second resonance frequency F2, where F1 is (F2+dF).

Thus the value of "dF" is directly related to the added mass weight 1b'.

FIG. 1c. is illustrating a group of or an array of individual nano-scaled cantilevers, according to the present invention, each exposing different resonance frequencies even if the are illustrated with equal lengths "l", which means that the thickness "t" and/or the width "w" are different.

The circle form or elliptic form of the reflecting surface 11 are intended to symbolize the orientation of a focused laser bream spot for detecting an oscillating movement of said cantilevers 1a, 1b . . . 1e, in a purpose of detecting and evaluating each oscillating first frequency related to its cantilever.

Figure 2:
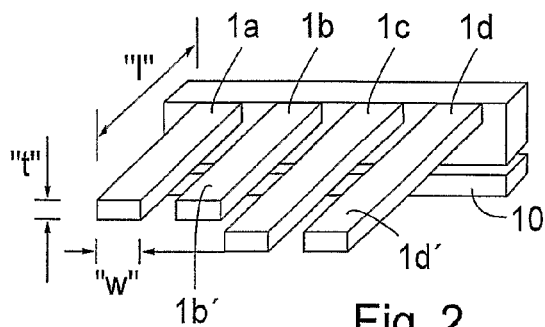
FIG. 2 illustrates in a perspective view an array of four nano-sized cantilevers exposing dimensions within the nanometer scale and where the cantilevers are allotted different length dimensions "l" for exposing different resonance frequencies.

FIG. 2 illustrates in a perspective view an array of only four nano-sized cantilevers 1a, 1b resp. 1c, 1d, exposing dimensions within the nanometer scale and where the cantilevers are pair wise allotted different length dimensions "l" (for cantilevers 1a and 1b and longer dimension for cantilevers 1c and 1d) for exposing different resonance frequencies, as well for the first resonance frequency F1 as for the second resonance frequency F2.

An oscillating means 10 is here arranged for transmitting oscillation frequencies to each of the cantilevers.

The present invention relates to a more completely formed arrangement 1 (see FIG. 3), adapted for a detection of shifts in sensed oscillation resonance frequencies using nano-scaled mechanical carrier means, illustrated as cantilever beams 1a, 1b, 1c . . . 1i, which is to be used as a sensitive method for determining local interactions on the cantilevers, such as the adsorption of a mass representing a mass weight on the cantilever.

If these cantilevers 1a, 1b, 1c . . . 1i are rendered sensitive to different molecules or other types of reactive objects/substances, their frequency shifts may be used as detectors for binding cycles, without the need of marking the object which is bonded for later detection.

The first resonance frequencies F1 of these cantilevers are depended upon their dimensions "l", "t" and "w", as shown in FIG. 2, and dependent upon the mass weight 1b' loaded on said cantilever.

Said second resonance frequencies F2 of these cantilevers are dependent upon their dimensions (identical dimensions and material structure), without any mass weight 1b' and this frequency is used as a reference frequency.

Figure 3:
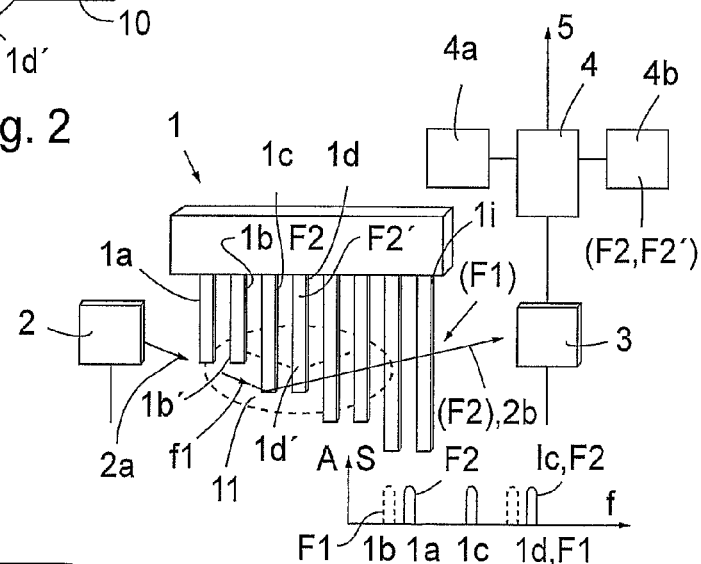
FIG. 3 illustrates a top view presentation, showing the principle behind an arrangement to obtain, in one single measurement, a spectrum of first resonance frequencies, where first resonance frequencies and second resonance frequencies are introduced in an amplitude "A" to frequency "f" illustration.

FIG. 3 further illustrates that a plurality of these cantilevers in an array format with simultaneous detection of the oscillating movement of each cantilever 1a, 1b, 1c . . . 1i, with the aid of a common light source 2 which, via reflection 11 against selected side portions of the cantilevers, impinges on a light- and position sensitive detector 3.

Said detected signal 2b and its different frequencies (f2) being received and calculated using a signal receiving and signal processing unit 4, where the processed signal 5 will be related to the movement of and the mass weight 1b' loaded on the relevant cantilever.

With reference to FIG. 3 it is further disclosed an arrangement 1 for detection of a first resonance frequencies (F1), related to each mass 1b' loaded carrier means 1b, and to compare said first resonance frequency F1 with a second resonance frequency F2, as a reference frequency, related to said carrier means and said frequencies (F2) are stored in said unit 4 in a memory means.

It is here to be noted that the carrier means 1a, is illustrating a carrier means without any mass weight loaded thereon to generate a reference frequency (F2) and carrier means 1b is illustrating a carrier means loaded with a mass weight 1b' to generate a first resonating frequency (F1) representing the measuring sequence.

The resonance frequency F1 allotted to the carrier means 1a is identical to the resonance frequency F2, if the mass weight 1b' did not effect said means 1b.

However it will here be noted a frequency shift, between the resonance frequency F2 and the measured frequency F1, and frequency F2 has a higher value than the measured frequency F1, by using frequency comparing and/or calculating means 4 to evaluate, by a noted frequency shift, the actual mass weight 1b'.

The present invention is based upon that a number of different measured resonance frequencies (F1) are sensed and evaluated and compared with corresponding reference resonance frequencies (F2) stored in said means 4.

FIG. 3 also indicates the differences in these frequencies F1 and F2 for cantilevers 1a, 1b resp. 1c, 1d.

It is also shown that a cantilever 1i does not expose any difference between the measured frequency (F1) and the corresponding stored value (F2) indicating that no mass load is influencing said cantilever 1i.

In FIG. 3 is illustrated an array of individual carrier means, such as 1a, 1b; 1c and 1d. These are arranged adjacent to each other in pairs 1a, 1b exposing each a first length, and pairs 1c, 1d exposing each a longer second lengths, which means that one or more of said carrier means are allotted different second resonance frequencies F2, F2'.

These resonance frequencies F1, F1', are the received resonance frequencies from said loaded carrier means 1b, 1d, during a measuring sequence, and they are received and/or evaluated simultaneously, or at least essentially simultaneously, in said signal receiving unit 3 and that said fsecond resonance frequencies F2. F2' are stored within said unit 3 or within said unit 4, in a memory 4b.

Received frequencies F1, F1' are compared and/or calculated within said calculating means 3, 4 with corresponding resonance frequencies F2, F2', stored in said unit 3 or said unit 4.

Figure 5:
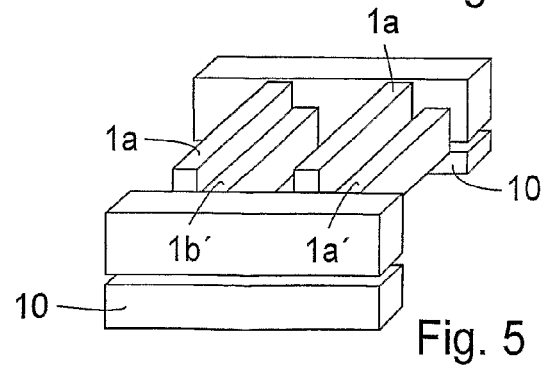
FIG. 5 illustrates an arrangement exposing a double cantilever array of the embodiment shown in FIG. 4 however adapted for electric sensing of the oscillating frequencies.

An oscillating means 10, illustrated only in FIG. 1c, FIG. 2 and FIG. 5, is adopted to generate and/or excite resonance frequencies to said array of carrier means 1a, 1b, . . . 1i, for bringing these into relevant resonance oscillation.

Said oscillating means 10 is adopted to and related to a frequencies sweeping type alternative said oscillating means is adopted to generate and/or excite a fixed frequency, exposing a value exceeding the highest frequency related to the highest basic resonance frequency, say cantilever 1a or 1b.

The present invention is based on a concept of producing and using arrays of carrier means, such as cantilevers, whose lengths "l" may vary or other efforts have been introduced, to expose different resonance frequencies, and where all of the cantilevers in this array of cantilevers of different lengths is illuminated simultaneously over a surface 11 from the light source 2 and where the total reflected signal 2b is detected 3, and in such an instance gives a spectrum, which contains a number of discrete resonance frequencies F1, F1' and so on.

When a mass weight 1b' or 1d' is adsorbed on its different cantilevers 1b resp. 1d the resonance frequency of each cantilever will shift from its reference value F2, and which shift is detected in a time slot simultaneously with the signal which gathers in all frequencies 2b or (F1).

Each frequency shift may then simply be determined and registered as a mass weight 1b' or 1d' as a signal 5.

This system and its arrangement is rapid by a simultaneous measurement of many cantilevers 1a, 1b, 1c . . . 1i and moreover if the different cantilevers have slightly different chemical or molecular reactive surfaces, a "fingerprint" can be obtained of an unknown mixture of gases or molecules adhered to the exposed and/or treated surface of the cantilever.

This system and its arrangement hence permit a rapid detection and by nano-sizing the cantilevers, each cantilever will obtain a high level of sensitivity for this detection of an added an loaded mass weight.

The invention has its application also in sensing and evaluating chemical and biological processes using a mechanical cantilever-like component characterized of being able to move in one or several orthogonal and semi-orthogonal directions under the influence of an external force.

The main use of this technology is to sense molecular interactions taking place on the surface of said mechanical component making it to bend due to mass load or due to strain in the surface layer.

Often it excites into resonance, to detect added mass as a shift of the resonance frequency.

Other potential areas can be systems and arrangements for digital image processing, imaging, medical, research, industrial, civil and military surveillance, monitoring and automatic sensor function.

The origin of the force to be detected can be of different kinds, including but not limited to heat, surface stress, mass as well as interactions of various kinds, such as ordinary visible light, UV-light, IR-light, THz-radiation, magnetic forces, polar and dispersion forces.

Examples of applications for this arrangement and its technology are:
  Motion, Acceleration and Chemical detectors,
  Biological, Medical and Surgical sensing,
  Cell and Sub-cellular sensing,
  Implanted Devices,
  Micron and Nano-sized Vehicles for guidance and reconnaissance By slicing a cantilever beam, 12 in FIG. 1a, using e.g. a FIB process, it is possible to make arrays of cantilevers having different lengths (see FIG. 3).

By making such an array of cantilever beams 1a, 1b, 1c . . . 1i and where the light is spread (hits) to all surfaces at the same time within the surface 11, it will be possible, in one single measurement, to collect information from many cantilevers, hence one will, for a certain mass weight being adsorbed onto each cantilever, detect in the detector unit 3 and/or processed in said unit 4 one single signal, representing all individual resonance frequencies F1. F1' and/or their evaluated shifts from frequencies F2, F2' and, by making a frequency analysis of the signal, it is possible to study the response from each cantilever.

If each cantilever is then e.g. functionalized to respond only to a certain molecule (or protein, antigen etc) it is a very elegant and simple scheme for making a point-of-care device, combining time analysis with uttermost sensitivities down to the few molecular levels.

Furthermore, the mechanical properties of cantilevers depend on Youngs modulus (E), the moment of Inertia (I), the density (☐) and on the dimensions. In a resonating mode any frequency follows the relation:

$$f = \frac{1}{2\pi}\sqrt{\frac{k}{0.24m}} = \frac{(1.875)^2}{2\pi}\frac{t}{l^2}\sqrt{\frac{E}{12\rho}} \quad [1]$$

$$k = \frac{3EI}{l^3}$$

$$I = \frac{bt^3}{12}$$

where "b" (or "w")=width, "t"=thickness, and "l"=length.
Considering Mass Sensitivity:

From eq. 1 above it is shown that the mass sensitivity (∂Dm/m) of the system is proportional to the frequency resolution:

$$\partial m/m = \partial f/f \quad [2]$$

Where; ∂m=mass change, m=initial mass, ∂f=frequency change and f=initial resonance frequency.

In order to increase the mass sensitivity, it is to increase "f" (thus leading to an increased "∂f" signal), or reduce "m" (leading to a reduction in "∂m"; these changes are linked to each other, and a reduction of "m" leads to an increase of "f".

Primarily, it is the length dimensions "l" or other chosen dimensions that must be increased in order to obtain a higher frequency.

As can be seen in eq. 1 the width "w" dimension is not significant (as long as the length is ≈10× larger than the width (which is the condition when eq. 1 is valid).

Hence, it will be possible to make shorter cantilevers but it is important to maintain a length/width ratio of roughly about 10. This means that in order to keep a standard laser deflection scheme for detection, we can only downscale to get may be 20 μm long cantilevers.

However, further shrinking or reducing the length may proceed down to let us say ≈1 μm (and the width correspondingly to ≈100 nm). Hence, the sensitivity would be further enhanced by factor of (20)², as compared to the 20 μm long case being the limit that present detection schemes may be stretched into.

(However, since typically cantilevers presently used as sensors have lengths of around 100 s of micrometers a reduction of the length to some micrometer achieves a factor of (100)² or so higher mass sensitivity (i.e. 10⁴ higher than present state-of-the-art).

The main problem caused by a direct consequence of this extreme down-scaling is how to detect the oscillating frequencies and any shifts thereof.

Most methods employ laser deflection system and hence since in the example given above, the width of the cantilever becomes smaller than both the wavelength of the laser light and the laser spot size, do not get enough high signal to noise ratio to be able to detect a movement of an individual small cantilever (FIG. 1b).

Hence, it is to develop new methods and arrangements in order to fully utilize the properties that one may achieve for the nano-scaled cantilevers in an array form.

It is here suggested to probe each cantilever individually using e.g. an Atomic Force Microscope (or an STM).

This is a principal elegant method, however, it is not possible to implement in real technology applications of nano-sized cantilevers.

One method and arrangement is to make an array of many (n) short and narrow cantilevers that are actuated in concert, if so the SNR will be restored and it will be possible to detect a signal giving a mass sensitivity of "n" times the individual sensitivities (see FIG. 1c & FIG. 2).

The present invention is thus related to an arrangement utilizing an array of "frequency elements", wherein each or a few individual frequency elements has its own specific resonance frequency property, denoted as a second resonance frequency (F2), making it possible to initiate the addition of an added mass 1b', 1d' onto the various frequency elements or on and/or in the surface of the elements situated top layers, and allowing the determination of the, as a function of the added mass, resonance frequency F1 of each or a few of the said frequency elements, denoted the second resonance frequency F2, wherein each frequency element's frequency property is measurable utilizing a sensing device and scheme and a computational unit 3 and/or 4, where the values, being representative for each individual and respective resonance frequency F2, related to each individual frequency element, are stored in a suitable memory 4b, and that the computational unit 3 or unit 4 in turn is linked to circuits and functions 4a allowing a value being representative for the frequency difference between the first and second resonance frequencies F1-F2 of each individual element.

Said elements are formed as cantilevers and that each cantilever has dimensions so that each cantilever has a specific resonance frequency, as being the case if each cantilever has a different lengths, as in FIG. 3, or different thickness and/or other allotted dimensions but the same length, as in FIG. 1c, and that the measurement of a multitude of the resonance frequency of the cantilevers is performed simultaneously, or more or less simultaneously, making it possible to evaluate a frequency spectrum, containing a number of discrete resonance frequencies (F1), allowing each individual difference in resonance frequencies to be evaluated by the circuits and the computational unit 3 and/or 4 in such a way that the presence and/or amount of an added mass onto each, or a few, identical cantilevers can be determined.

Said cantilevers are in FIG. 3 illuminated by a light source 2 and that the reflected beam in a surface 11 is positioned towards a position sensitive photodetector 3, and the position of the reflected beam 2b with its frequencies (F1) onto the position sensitive photodetector unit 3 depends on the position and the actual resonance frequency of the cantilever.

The detection 3 is arranged in such a way that a frequency detection can be made.

Further, said cantilevers have at least one of its dimension in the micron or nano-scale.

Said mass is introduced as a local interaction, such as an adsorption onto the cantilever.

Said cantilevers are prepared to be sensitive for different and specific kinds of molecules and/or other types of components/substances to enable a specific frequency difference between first and second resonance frequencies to be determined and evaluated.

Said cantilevers are arranged as an array of cantilevers or a subset of all cantilevers within an array and these are illuminated simultaneously with the same light source 2 and that the total reflected beam 2b is detected in the frequency domain whereby a spectrum is created containing a number of discrete measured resonance frequencies.

Said light source 2 is arranged so that the light beam 2a is illuminating a light reflecting surface 11 on one side of the cantilevers 1a, 1b, 1c . . . 1i, which then reflects the beam 2b onto the position sensitive photo detector 3, being arranged so that a signal obtained is significant for each individual cantilevers position and/or frequency, thereby allowing each measured cantilever's resonance frequency to be determined in the frequency domain simultaneously.

Said computational element is made so that it can detect the differences in frequencies of each individual cantilever as a consequence of changing of mass for each cantilever, and the mass is changed when a mass is adsorbed in some way on any of the cantilevers.

A mass change is occurring on at least one of the cantilevers by a controlled interaction between its surface and an object with a mass.

A controlled interaction consists of one or more molecular reactions and/or the controlled interaction consists of one or more chemical reactions.

Figure 4:
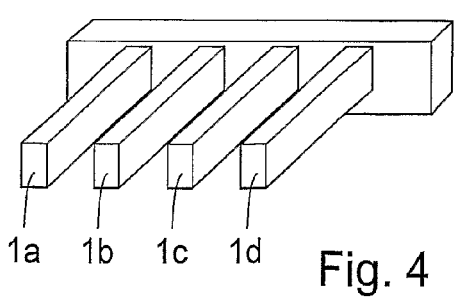
FIG. 4 illustrates an arrangement of laterally actuable carrier means in the form of cantilevers.

Another configuration of the carrier means, or in the form of cantilevers, is to turn them 90° and then form an array of parallel laterally actuated cantilevers (FIG. 4). In this application the position of the light source 2, the direction of the beam 2a, the reflecting surfaces 11 and the direction of the reflected light beam 2b must be changed for directing the reflected light beam 2a towards the unit 3.

In this way fabricated structures being able to exhibit grating performance.

By detecting the reflected laser light from such gratings it will be possible to deduce tiny variations in the cantilever positions.

Indeed such phenomena have recently been shown and especially, when the grating objects are in the sub-wavelength scale, large effects have been reported.

As a matter in fact, just by using the naked eye it will be possible to detect any changes of the grating period down to few nanometers.

Hence, such a scheme is presently of tremendous interest since it may be utilized in various optical switching devices, having performance well above e.g. presently employed technology of micromechanical mirrors being used in e.g. digital projectors.

Further enhancement of such structures can be made by making a double interdigitated structure, as schematically shown in FIG. 5.

Here, by having the cantilevers electrically conductive one may be able to electrostatically deflect the cantilevers, thereby changing the grating period, i.e. obtaining a tunable grating structure.

The methods to detect the cantilever deflections may now be either optical, inspired as above, or electrical, measuring e.g. the S-parameters, from which it can be obtained the resonance frequencies.

In this context, stray capacitanses are a problem and in order to understand the electric field in these kind of structures it has to be calculated the electric field distribution and predicted that the capacitive signals will be in the order of some "fF", a signal level being possible to detect when taking necessary precautions.

When the cantilevers are in the few 100 nm range it has been observed very nice possibilities to utilize the optical diffraction as the signal giving us the possibility to determine the resonance frequencies (new data to be written up).

Further, replacing the nanocantilevers with epitaxially fabricated nanowires will even further allow increased sensitivities since the mechanical properties of the wires promise resonances in the GHz range.

One possibility to make detailed mechanical investigations is to make AFM-induced bending, as previously probed nanosized cantilevers.

However, said wires have a hexagonal surface so a normal AFM-tip will slide off the nanowire surface during scanning along its length directions.

However, using a FIB, it will make a fork-shaped tip, making the tip to stay on the nanowire.

Of course, the same detection problem as initially started exists for the nanowires but it may in a similar array configuration, as discussed above, be able to detect the motion and resonances from the nanowires working in concert.

One interesting optical method would be to stroboscopically probe the resonance frequencies using an ultrafast laser (conditioned that the repetition rate of the laser can be sufficiently controlled).

It has been an increased interest to utilize higher order resonances for enhancement of the Q-value in resonance and the detection of e.g. adsorbed mass on micron sized cantilevers.

Such an excitation and detection scheme will also be investigated with the structures outlined above. Especially interesting is to utilize the possibilities offered by the FIB-system to position metal spots at well defined locations serving as molecular binding spots directing target molecules to positions on a cantilever where the higher order lateral resonances does not exhibit nodes.

Also, to explore detection of not only the resulting resonance frequency shift but also the dynamics of the shift that may, in a way corresponding to the dynamic detection mode using dissipation detection in QCM, also adds knowledge of the real-time dynamics of binding events happening onto the cantilever surface.

In order to create specific binding sites of, for example antibodies and antigens focus, will be put on functionalizing the surfaces of the nanoresonators. Each sub-array of similar nanocantilevers is to be addressed individually with a specific anti-body (ab).

Then nanocantilevers are exposed to different antigens (ag).

The specific binding event between ab/ag will be detected as a frequency shift in real-time. This label-free detection of ab/ag binding on nanocantilevers where the frequency shift will correspond to a mass resolution at the few molecular level, holds great promise for being able to realize into a working application demonstrator.

The use of nanowires as sensing devices has a high potential once the detection method is fully solved.

The gold catalyst particle at the top of the wire (a remnant from the growth) will be of tremendous advantage when using thiols.

Bio-recognition binding/unbinding events using ab/ag, can thus take place at the very end of the wire, thus also simplifying the theoretical calculations regarding frequency shifts as mass is bound to an oscillating wire.

The detection of resonance frequency shifts of nanomechanical cantilevers can be used as a sensitive method for probing local interactions on the cantilevers, such as adsorption of extra mass, for example external molecules.

If the cantilever surfaces are functionalized for certain molecules, the frequency shifts will allow monitoring the chemical recognition and adsorption of the counter molecules without pre-labeling them.

The resonance frequencies of the cantilevers depend on their dimensions. Usually an array of several cantilevers are used where each individual cantilever's movement is detected by the laser-deflection principle, in which each cantilever reflects the light from an individual light source, off to a light- and position-sensitive detector.

The created signal is a measure of the movement of the cantilevers (their amplitude) in relation to the frequency. The frequency signals from the individual cantilevers in the array are either collected one by one (serial), or by time multiplexing.

An effect of this measurement mode is that the amplitude and frequency of the individual cantilevers are monitored at different times. An alternative is to collect all signals through fast parallel datalinks, meaning that large data files have to be handled/stored.

The invention is based on fabricating arrays of differently long cantilevers and where all cantilevers in the array are illuminated by one single light source.

The total reflected signal, which is a composition of all the individual cantilever's reflections, is detected in the frequency mode and will thus give a spectrum containing the discrete resonance frequencies corresponding to the individual cantilevers in the array.

The invention is of course not restricted to the above described and illustrated exemplifying embodiment thereof and that modifications can be made within the scope of the inventive concept illustrated in the accompanying claims.

Especially it is to be noted that here described means may be combined with one or more additional means, described or not described.

REFERENCE LIST

Binnig G, Quate C F., Gerber C., Phys Rev Lett 56, 930 (1986)
Giessibl F J. *Science* 267, 68 (1995)
Fritz J., Baller M K., Lang H. P., Rothuizen H., Vettiger P., Meyer E., Guntherodt H. J., Gerber C., Gimzewski J. K., *Science* 288, 316 (2000)
Barnes J. R., Stephensson R. J., Welland M. E., Gerber C., Gimzewski J. K., *Nature* 372, 79 (1994)
Ekinci K. L., Yang Y. T., Roukes M. L., *J. Appl. Phys.* 95, 2682 (2004)
Berger R., Delamarche E., Lang H. P. Gerber C., Gimzewski J. K., Meyer E., Guntherodt H. J., *Science* 276, 2021 (1997)
Battiston F. M., Ramsmeyer J. P., Lang H. P:, Baller M. k., Gerber C., Gimzewski J. K., Meyer E., Guntherodt H. J., *Sensors and Actuators B-Chem,* 77, 122 (2001)
Lang H. P., Berger R., Battiston F, Ramsmeyer J. P., Meyer E., Andreoli C., Brugger J., Vettiger P., Despont M., Mezzacasa T., Scandella L., Guntherodt H. J., Gerber C., Gimzewski J. K., *Appl Phys A Matri Science & Process,* 66, S61, (1998)
McKendry R., Zhang J., Amtz Y., Strunz T., Hegner M., Lang H. P., Baller M. K., Certa U., Meyer E., Guntherodt H. J., Gerber C, *PNAS* 99, 9783 (2002)
Lang H. P., Hegner M., Gerber C., *Materials Today* 8, 30 (2005) nanoscale motion w naked eye
Kar A. K., George M. A., *J. Appl. Phys.* 94, 4626 (2003)

The invention claimed is:

1. An arrangement for detecting a first resonance frequency, associated with a carrier means loaded with an added mass, and comparing said first resonance frequency with a second resonance frequency, associated with said carrier means without the added mass, in order order to evaluate, based on a noted resonance frequency shift, the mass and/or weight of the added mass, comprising:

(a) an array of individual carrier means in which the individual carrier means are adjacent to each other, wherein one or more of said individual carrier means are characterized by different second resonance frequencies, and wherein the individual carrier means are simultaneously illuminated, and (b) a receiving and/or calculating unit that is configured to simultaneously detect a total reflected signal comprising a number of first resonance frequencies received from said loaded carrier means, thereby allowing carrier means' resonance frequencies to be detected simultaneously in a frequency domain, wherein said first resonance frequencies are compared and/or calculated within said receiving and/or calculating unit with corresponding second resonance frequencies stored in said unit, and wherein the arrangement detects a first resonance frequency, associated with a carrier means loaded with an added mass, and compares said first resonance frequency with a second resonance frequency, associated with said carrier means without the added mass, in order to evaluate, based on a noted resonance frequency shift, the mass and/or weight of the added mass.

2. An arrangement according to claim 1, wherein an oscillating means generates and/or excites resonance frequencies to said array of carrier means.

3. An arrangement according to claim 1, wherein said oscillating means is related to a frequencies sweeping type.

4. An arrangement according to claim 1, wherein said oscillating means generates and/or excites a fixed frequency, exposing a value exceeding the highest frequency related to the highest basic resonance frequency.

5. An arrangement according to claim 1, wherein said individual carrier means are cantilever.

6. An arrangement according to claim 5, wherein the resonance frequency of each cantilever provides a reference frequency that is dependent upon the cantilever's dimensions, including width, thickness and/or length, and wherein the cantilever's dimensions are within the nanometer range or scale.

7. An arrangement according to claim 5, wherein two or more of said cantilevers have different lengths.

8. An arrangement according to claim 1, wherein said carrier mean are illuminated by a light source, such as a laser beam generating source, in such a manner that an illuminating light beam is reflected from an illuminated side portion of a carrier means to said receiving and/or calculating unit, wherein the reflected light beam is detected by a position-sensitive photodiode.

9. An arrangement according to claim 8, wherein said position-sensitive photodiode emits an electrical signal in response to the detected light beam, wherein the electrical signal is dependent on the position and frequency of the carrier means which reflects the illuminating light beam.

10. An arrangement according to claim 1, wherein each frequency shift due to a change in mass of a carrier means is detected.

11. An arrangement according to claim 1, wherein a mass load and any changes thereof are caused by adsorption of mass to the surface of a carrier means.

12. An arrangement according to claim 1, wherein a mass load and any changes thereof are caused by addition of mass to a carrier means, wherein the addition of mass occurs through a controlled interaction.

13. An arrangement according to claim 12, wherein said controlled interaction takes place between the surface of a carrier means and an object possessing mass.

14. An arrangement according to claim 12, wherein said controlled interaction comprises a molecular reaction.

15. An arrangement according to claim 12, wherein said controlled interaction comprises a chemical reaction.

16. An arrangement according to claim 12, wherein said controlled interaction comprises a physical reaction.

17. An arrangement according to claim 1, wherein said individual carrier means are epitaxically fabricated nanowires.

18. An arrangement according to claim 1, wherein the surface of one or more of said individual carrier means is functionalized by attachment of a specific antibody and wherein the added mass is an antigen that is specifically bound by the antibody.

19. A method for probing a molecular, chemical and/or physical interaction comprising
(a) providing an arrangement according to claim 1,
(b) detecting a first resonance frequency, associated with a carrier means loaded with an added mass,
(c) comparing said first resonance frequency with a second resonance frequency, associated with said carrier means without the added mass, and
(d) evaluating, based a noted frequency shift, the mass and/or weight of the added mass,
wherein said molecular, chemical and/or physical interaction takes place on the carrier means.

20. A method according to claim 19, wherein the carrier means is a nanomechanical cantilever.

21. A method according to claim 19, wherein said interaction is the adsorption of mass.

22. A method according to claim 21, wherein the adsorbed mass is an external molecule.

* * * * *

UNITED STATES PATENT AND TRADEMARK OFFICE
CERTIFICATE OF CORRECTION

| | |
|---|---|
| PATENT NO. | : 7,966,881 B2 |
| APPLICATION NO. | : 12/226658 |
| DATED | : June 28, 2011 |
| INVENTOR(S) | : Lars Montelius et al. |

It is certified that error appears in the above-identified patent and that said Letters Patent is hereby corrected as shown below:

On the Title page, item 57 (abst.) line 8, "($1a$, $1b$...$1n$)" should read -- ($1a$, $1b$...$1i$) --.

Claim 3, col. 15, line 14, "claim 1" should read -- claim 2 --.

Claim 4, col. 15, line 16, "claim 1" should read -- claim 2 --.

Claim 5, col. 15, line 21, "cantilever" should read -- cantilevers --.

Signed and Sealed this
Eighteenth Day of October, 2011

David J. Kappos
*Director of the United States Patent and Trademark Office*